United States Patent [19]

Roscamp

[11] 3,774,183

[45] Nov. 20, 1973

[54] PIVOTAL SUPPORT ASSEMBLY FOR A MAGNETIC HEAD

[75] Inventor: Thomas A. Roscamp, Goleta, Calif.

[73] Assignee: Applied Magnetics Corporation, Goleta, Calif.

[22] Filed: June 26, 1972

[21] Appl. No.: 266,407

[52] U.S. Cl. .................... 340/174.1 E, 179/100.2 P

[51] Int. Cl. .................... G11b 5/60

[58] Field of Search .................... 340/174.1 E, 174.1 F; 179/100.2 CA, 100.2 P

[56] References Cited

UNITED STATES PATENTS

| | | | |
|---|---|---|---|
| 3,368,210 | 2/1968 | Zimmer | 340/174.1 E |
| 3,599,193 | 8/1971 | Core | 340/174.1 E |
| 3,213,461 | 10/1965 | Goddarp | 340/174.1 E |

*Primary Examiner*—Vincent P. Canney
*Attorney*—Daniel J. Meaney, Jr.

[57] ABSTRACT

A Magnetic Head Pivotal Support for loading magnetic transducers onto the surface of a magnetic medium with a thin film of moving fluid there between wherein the support includes a bifurcated spring element, a pair of cylindrically shaped pivot elements connected to the ends of the bifurcated elements forming an alignment means and a rectangular shaped pivot bar having apertures therein which communicate with a spherical end of the cylindrical pins, which pivot bar is connected to the magnetic transducers and pivotally supported by the bifurcated spring element permitting movement of the magnetic medium and restricting yaw and movement in a tangential and radial direction is shown.

12 Claims, 9 Drawing Figures

PIVOTAL SUPPORT ASSEMBLY FOR A MAGNETIC HEAD

BACKGROUND OF THE INVENTION

1. Field of the Invention

This invention relates to a novel and improved magnetic head support assembly, and in particular to a pivotal support assembly which permits a flying magnetic head to move toward and away from the surface of a medium at a predetermined attitude and altitude (flying height) while maintaining the magnetic transducer in a selected lateral position relative to said surface of the storage medium.

2. Disclosure of the Prior Art

It is known in the prior art to position a magnetic head in intimate contact with the moving surface of a magnetic medium such as, for example, in magnetic disc files. In certain of the exemplary magnetic disc files, when the rotating magnetic medium is at rest or rotating at a very slow rate of rotation, the magnetic head is permitted to come into contact with the surface of the medium. As the rotation of the medium is commenced and/or increased, the rotation thereof is increased to a desired revolutions per minute (rpm), the magnetic head is lifted off of and out of contact with the rotating surface of the medium. The lifting force is caused by a thin laminar film of fluid, normally air, causing the head to fly at a predetermined distance or altitude above the surface of the medium.

In other known magnetic disc files, a magnetic arm assembly positions or loads the magnetic head onto the surface of the disc only after the rate of rotation of the magnetic medium has reached a selected rpm. In this manner the magnetic head is intentionally not permitted to contact the surface of the medium, but is controllably loaded or inserted into the thin laminar film of fluid which supports and lifts the head from the surface of the medium.

In flying a magnetic head over a surface of a moving medium, roll angle and pitch angle (angle of attack) an altitude (flying height of the head relative to the surface) may vary. Concurrently, the X-Y components or directions of movement, generally referred to as tangential and radial directions of movement and yaw angle (azimuthal angle) are restricted.

For purpose of this explanation, attitude is defined to mean the angular position of pitch and roll with respect to the air bearing or thin fluid film. Altitude is defined to mean the flying height between the gap of the magnetic head and the surface of the disc. Restriction of movement in a lateral direction is defined to mean restriction of yaw and movement in the tangential and radial directions.

In certain of the magnetic disc files, the magnetic heads may be moveable and be capable of being shifted inward or outward relative to the center of a rotating circular surface of the disc. The shifting of the magnetic head in a lateral position affords positioning of the magnetic head over a predetermined track located on the magnetic disc. When the magnetic head is selectively positioned, data may be then recorded or reproduced from a predetermined track on the disc.

In other known magnetic disc files, the magnetic heads are fixed in lateral position and result in one magnetic head being dedicated per track. In either case, the magnetic head flies on a thin fluid film on the surface of the magnetic medium which is rotated at a selected rpm.

As the magnetic head is held in position, slight surface irregularities may cause the density of the laminated thin film of fluid to vary. When this occurs, the attitude and altitude at which the head flies over the surface of the medium may vary slightly due to the aero-dynamic characteristics of the head, thin film, fluid and surface. Accordingly, it is desirable that the support assembly for the magnetic head permit the magnetic head attitude and altitude to vary slightly relative to the surface of the medium, all of which are dependent on the flying characteristics of the head. However, it is necessary that the lateral position of the head be maintained at the selected position independent of variances in attitude and altitude.

It is known in the prior art to form a gimbal spring assembly wherein a U-shaped support terminated in two finger like members. The finger like members support a torsion bar which is rigidly affixed to the ends thereof and extends there between. The magnetic head is then affixed to the torsion bar member in a manner to permit variances in attitude or pitch, which are counteracted by the torsion spring characteristics of the torsion bar member.

Many types of torsion bars have been used. In certain applications, a rigid, flexible, relatively thin rectangular shaped torsion bar is extended between the open ends of a U-shaped member, which U-shaped member is also substantially rigid and relatively thin in construction. The ends of the rectangular shaped torsion bar are rigidly attached to the end of the U-shaped member. The magnetic head is attached to the rectangular shaped torsion bar and the variation in pitch is obtained by rotating the pivot bar along the axis parallel to the larger dimension of the rectangular shaped bar.

It is also known to use a pivot bar which is substantially cylindrical in shape and which is extended between the ends of a U-shaped member. Each end of the cylindrical shaped torsion bar is welded to the finger like member of the U-shaped support. The magnetic head is attached to the torsion bar and the variance in pitch is obtained by rotating the bar around an axis substantially parallel to the axis of the cylinder.

The prior art magnetic head support assemblies have several disadvantages. First, when the head is assembled the dimension of the U-shaped support member and the pivot bar must be critically matched. Also, connection between the torsion bar and the support members is usually in the form of a weld or other type of fastening means which rigidly affix the bar to the support member. In the prior art magnetic head assemblies, the mechanical rotation of the pivot and deflection of the finger like members of the U-shaped support tend to loosen the fastening means resulting in a misalignment there between. Also, once a magnetic head is attached to a torsion bar, it is extremely difficult to interchange heads and support assemblies. In order to exchange magnetic heads it is necessary to disassemble the support which affects the torsion support characteristics of the torsion bar. Also, if such interchange is in fact made, it is necessary to reweld or otherwise reattach the torsion bar to the U-shaped support member and to realign the support assembly. Also, it is necessary to form the torsion bar of a metal having a predetermined torsion spring characteristic which will not fatigue with use. In addition, torsion bar magnetic support assemblies have a tendency to misalign with prolonged use.

Accordingly, it is highly desirable to have a simplified, inexpensive, easily changeable magnetic head support assembly wherein alignment is substantially obtained when a pivot bar, having a magnetic head attached thereto, is attached to complete the support assembly.

SUMMARY OF THE INVENTION

An object of this invention is to provide novel and improved pivotal support assembly for a magnetic head useful for contact recording.

Another object of this invention is to provide a magnetic head assembly that permits a magnetic head under a predetermined loading force to vary its attitude and altitude with respect to the surface of a moving magnetic medium while maintaining a fixed lateral position of the head relative to the surface.

Yet another object of this invention is to provide a pivotal magnetic head assembly having a novel alignment means and pivot bar which permits interchanging of magnetic transducers without the necessity of realigning the head assembly.

The integral structure of the pivotal head assembly utilizes elements that are economical to produce, easily assembled and which are designed to permit assembly of parts with varying manufacturing tolerances without affecting the alignment of the magnetic head assembly.

BRIEF DESCRIPTION OF THE DRAWINGS

The foregoing and other objects, features and advantages of the invention will be apparent from the following description of the preferred embodiment of the invention when considered together with the illustrations in the accompanying drawings which include the following figures.

Similar numbers refer to similar elements throughout the drawing.

DESCRIPTION OF THE PREFERRED EMBODIMENT

Figure 1:
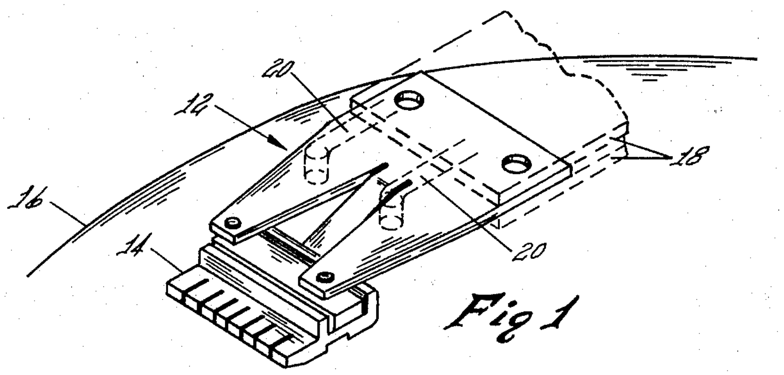
FIG. 1 is a perspective view of a magnetic head pivotal support assembly, in accordance with this invention, and associated arm support and surface of a moving magnetic medium.

In FIG. 1, a pivotal support assembly for a magnetic head generally designated as 12 is shown supporting a magnetic head 14 over the surface of a magnetic medium 16. The illustrated magnetic medium is a rotating magnetic disc. The pivotal support assembly 12 is shown connected to and supported by an arm assembly generally designated as 18, which arm assembly is shown by dashed lines. The arm assembly 18 includes a loading member 20 which functions to place a predetermined load onto the pivotal support assembly 12.

Figure 2:
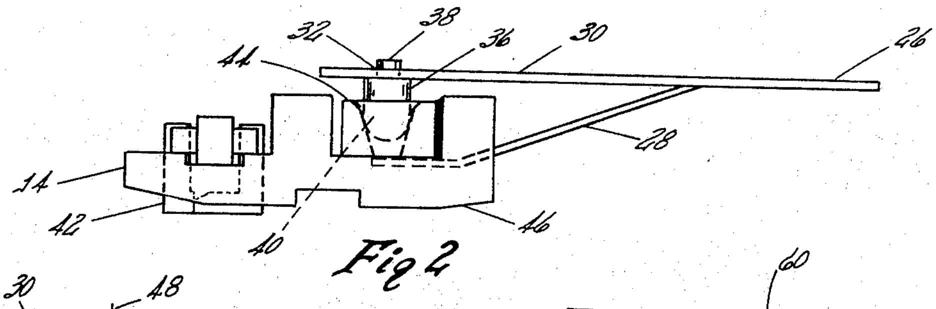
FIG. 2 is a side view showing certain features of the elements in dashed lines of the magnetic head support assembly including magnetic head housing and magnetic core.

FIG. 2 shows the components of the preferred embodiment of a pivotal support assembly in greater detail. The pivotal support assembly of FIG. 2 is an integral structure for pivotally loading a magnetic housing 14 which includes a magnetic core on the surface of a magnetic medium 16. The support assembly 12 includes a single bifurcated leaf spring element 26. The leaf spring element 26, in this example, has an elongated deflectable center member 28 which is positioned between bifurcated member 30 located on each side thereof. The center member 28 is capable of being deflected, as shown in FIG. 2, a predetermined distance below the bifurcated members 30. Then the center member 28 is so deflected in a predetermined direction, the center member has a bias which acts in a direction to restore the center member 28 back into position between the undeflected bifurcated members 30.

It is an alternative embodiment to mount the pivot bar relative to the magnetic head housing such that the elongated center member may be eliminated thereby supporting the head by means of a pivot bar 44 and the bifurcated elements 30.

At the end of each bifurcated member 30 is an alignment means, which in this embodiment are in the form of a pair of pin like, cylindrically shaped pivot elements 36. Pivot elements have one end thereof 38 rigidly fastened to the terminus of each bifurcated member 30. The other end 40 of each pivot element 36 is substantially spherical in shape, the pivot elements 36 are mounted into holes 32 (FIG. 2) of the terminus of each bifurcated member 30. Each pivot element 30 is in a plane substantially perpendicular to the spring element 26 and concurrently are substantially parallel to each other.

Figure 3:
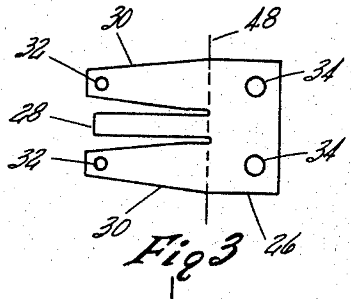
FIG. 3 is a top view of a preferred embodiment of a bifurcated spring element having an elongated deflectable center portion.

A pivot bar 44, which in this embodiment is rectangular in shape, is adapted to be connected to a magnetic head 46. The magnetic head may be any type of known transducer, either the contact or non-contact type. FIG. 3 shows the single bifurcated leaf spring element 26 in greater detail. Each bifurcated member 30 is located at the edges of the element 26 and are substantially finger like members. The elongated center member 28 is located between the bifurcated elements 30. The deflection of the elongated center member 28 and bifurcated members 30 is required. The deflection generally occurs about the axis of dashed line 48 of FIG. 3. Center members 28 may be deflected downward from the top view of FIG. 3 and by placing an element, such as a pivot bar 44, between the deflected center members 28 and the bifurcated members 30 in the undeflected position. The restoring force of the center member 28 would urge center member 28 towards its relaxed undeflected position.

Spring element also has holes 34 adapted for fastening the spring element 12 to the arm assembly 18.

Figure 4:
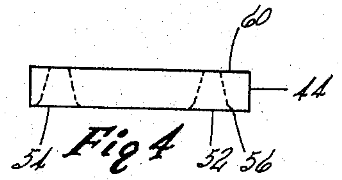
FIG. 4 is a front view of a pivot bar illustrating certain features thereof by dashed lines.
Figure 5:
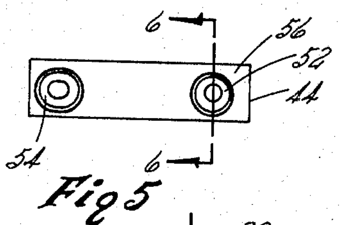
FIG. 5 is a bottom view of the pivot bar of FIG. 4.
Figure 6:
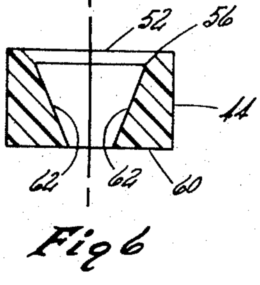
FIG. 6 is a cross-sectional end view of a pivot bar taken along section lines 6—6 of FIG. 5.

The pivot bar may be an element which is depicted in FIGS. 4 through 6. FIG. 4 shows a front view of one embodiment of a pivot bar 44 which is rectangular in shape. The pivot bar has a first aperture 52 extending therethrough at one end thereof, which aperture has a generally circular cross-section. At the other end of the pivot bar 44 is a second aperture 54 which has a generally elliptical cross-section. Each of the apertures have a dimension on one surface 56 of pivot bar 44 which have a dimension slightly larger than the diameter of the pivot elements 36.

FIG. 5 shows a top view of pivot bar 44 showing the surface 56 in greater detail. It is readily apparent that aperture 52 is generally circular in cross-section while aperture 54 is generally elliptical. The circular cross-section hole 52 functions to fix the X-Y dimension, or tangential and radial direction of movement. The elliptical cross-section hole 54 functions to fix the angle of yaw.

From the top view of FIG. 5 and from the front view of FIG. 4, it is apparent that the apertures each have inwardly sloping walls and reduce in diameter such that at the outer surface 60 of pivot bar 44 (FIG. 4) has a dimension which is less than that of the pivot element 36. In the preferred embodiment the angle of the inwardly sloping wall is about 45°, but the range thereof may be about 30° to about 60°.

The pivot bar 44 may be formed of a light weight rigid plastic material.

The section of FIG. 6 shows the interior of aperture 62 in greater detail. In particular, aperture 52 has inwardly sloping walls 62 forming a conical shape surface within the interior thereof. The diameter of aperture 52 at surface 56 is greater than the diameter of pivot element 36. However, the diameter of aperture 52 at surface 60 of pivot bar 44 is less than the diameter of pivot element 36.

Figure 7:
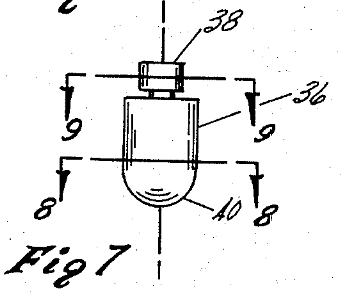
FIG. 7 is a front view of a pivot element.

Pivot element 36 is shown in greater detail in FIG. 7. Pivot element 36 has a cylindrical shaped center portion which has an upper end 38 which has a diameter slightly less than that of the main portion of element 36. The other end 40 of pivot element 36 is generally spherical in shape. The one end 38 is adapted to be inserted into holes 32 located at the end of each bifurcated member 30, which holes 32 are shown in FIG. 3. The other end 40 is adapted to be inserted into the apertures 52 and 54 of pivot bar 44.

Figure 8:
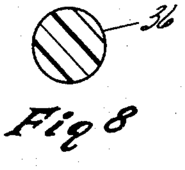
FIG. 8 is a section of a pivot element taken along section lines 8—8 of FIG. 7.
Figure 9:
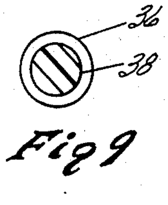
FIG. 9 is a section of a pivot element taken along section lines 9—9 of FIG. 7.

The section of FIG. 8 shows the center cross-section of the pivot element 36 illustrating the maximum dimensions required for the apertures 52 and 54 of pivot bar 44. The section FIG. 9 shows the diameter of the one end 38, which diameter is that required for the holes 32 located at the terminus of the bifurcated member 30.

Referring again to FIG. 2, when the pivot elements 36 are attached by one end 38 through holes 32, the pivot elements are generally perpendicular from the ends of the bifurcated members 30. The distance between aperture 52 and 54 is determined substantially by the distance between holes 32 of the bifurcated member 30. During assembly, the pivot bar 44 is inserted between the deflected center member 28 and the pivot elements 36. The pivot elements are positioned into the apertures 52 and 54 and communicate with the conical shaped interior aperture walls 62 (FIG. 6). The pin members then align the pivot bar there between. Thus, the variances in dimension between holes 32 or variances in dimensions between aperture 52 and 54 do not become critical. Alignments of the pins within the apertures 52 and 54 affords proper alignment which compensates for such variances. Thus, the pin elements 36 and the pivot bar 44 need not be manufactured to precise tolerances as required in the prior art. Also, the pivot bar 44 is not subject to torsional support loading, enabling the pivot elements 36 to substantially provide alignment of the pivot bar. The pivot bar 44 when connected to a magnetic head 46 permits the magnetic head to vary in attitude and altitude relative to the surface of the magnetic medium. Concurrently, the support assembly affords pivotal movement of the magnetic head by deflection of the bifurcated members 30 and the center member 28 about the axis illustrated by dashed line 48 of FIG. 3. However, the magnetic transducer is held in a rigid lateral position by bifurcated members 30, pivot elements 36 and pivot bar 44.

In one improvement of this invention the pivotal support assembly was used for a contact type head having 8 channels capable of recording and reproducing information from a rotating magnetic disc. Leaf spring element 26 was formed from beryllium copper type Berylco-25 and was 0.010 inches (0.0254 cm) in thickness. The pivot element 36 was formed of graphite impregnated nylon, type number Nylatron G.S. The pivot bar 44 was formed of phenolic plastic, type number FM4004. The diameter of pivot element 36 is 0.050 inches (0.127 cm) and the overall length thereof was 0.100 inches (0.254 cm). The length of the pivot bar 44 was 0.600 inches (2.124 cm). Each magnetic head was loaded with a spring force, via a load member 20 of FIG. 1, of approximately 100 grams. The flying height of the head when flown over the disc was about 70 microinches (0.001778 mm).

What is claimed is:

1. A support forming an integral structure for pivotally loading a magnetic transducer on to a surface of a magnetic medium and comprising:

a single bifurcated leaf spring element having located at one end thereof an elongated deflectable center member positioned between the bifurcated members, said center member when deflected having a bias which acts in a direction to restore said center member into position between the undeflected bifurcated members;

alignment means rigidly connected to the ends of the bifurcated members and positioned to extend therefrom in a predetermined direction; and a pivot bar positioned between said center member deflected in said predetermined direction and the bifurcated members with each end of the pivot bar communicating with said alignment means, said deflected center member and said alignment means yieldably supporting said pivot bar there between, said pivot bar being adapted to be supportably connected to said magnetic transducer for loading said transducer on to selected position of the surface of a magnetic medium while concurrently affording pivotal movement of the magnetic transducer by deflection of the bifurcated members and center member in response to pitch, roll and altitude of the transducer relative to said surface and maintaining said pivot bar and magnetic transducer in the angle of yaw and movement in the tangential and radial direction.

2. The support of claim 1 further comprising:

arm assembly means operatively coupled to said spring element at the other end thereof for moving said transducer into position parallel to and spaced a predetermined distance from said surface.

3. The support of claim 1 wherein:

said alignment means includes a pair of pin members one of which is connected by one end thereof to the terminus of each of said bifurcated members in substantially parallel alignment with each other and with the other end of said pin members freely extending from said bifurcated member and having a generally spherical shape; and wherein said pivot bar includes a first aperture at one end thereof having a generally circular cross-sectional shape and a dimension slightly larger than the diameter of the spherical end of said pin members and a second aperture at the other end thereof having a generally elliptical shape and a dimension, on the same surface as said first aperture, slightly larger than the diameter of said spherical end of said pin members, each of said apertures having inwardly sloping walls forming a conical shaped surface within the interior of said apertures, said pin members being positioned into said apertures and communicating with said conical shaped interior aperture walls to rigidly support said pivot bar in alignment therewith between said deflected center member and said bifurcated members.

4. The support of claim 2 further comprising:

a cam member operatively connected to said arm assembly means and adapted to communicate with said spring element to provide a predetermined spring bias thereon for loading said transducer onto the surface of said magnetic medium.

5. The support of claim 3 wherein said pivot bar is generally rectangular in shape.

6. The support of claim 3 wherein said pin members are generally cylindrical in shape.

7. The support of claim 5 wherein said pivot bar is formed of a plastic material.

8. The support of claim 6 wherein said pin member is formed of a graphite impregnated nylon material.

9. A pivotal support for loading a transducer on a thin film of moving fluid comprising:

means including spring element members;

a pair of cylindrically shaped pivot elements each having one end thereof rigidly fastened to the terminus of each member to position each of said pivot elements in a plane substantially perpendicular to said spring element members and substantially parallel to each other, the other end of each of said pivot elements being substantially spherical in shape and freely extending from said spring element members; and a rectangular shaped pivot bar adapted to be operatively connected to a transducer, said pivot bar having a first aperture extending therethrough at one end thereof and formed of a generally circular cross-section and a second aperture extending therethrough at the other end thereof and formed of a generally elliptical cross-section, each of said apertures having a dimension slightly larger than the diameter of said other end of said pivot element and located on the same one surface of said pivot element and inwardly sloping side walls which reduce the diameter of said aperture to a dimension which is less than that of said other end of said pivot element, said pivot bar being positioned to be contiguous with said spring element members and with said same one surface being positioned toward said spring element members enabling said pivot elements to be positioned in said apertures and communicate with said inwardly sloping side walls to align said pivot bar therebetween, said pivot bar being connected to said magnetic transducer and being adapted to load the transducer connected to said pivot bar into a selected position within the thin film of moving fluid enabling the transducer to roll and pivot within said thin film restricting lateral movement of and the angle of yaw of said transducer within said thin film.

10. The pivotal support of claim 9 further comprising means adapted to connect said spring element to an arm assembly means capable of selectively positioning said transducer on said think film of moving fluid.

11. The pivotal support of claim 9 wherein the angle of slope of said side walls is between about 30° and about 60° with respect to the axis of the aperture.

12. The pivotal support of claim 10 wherein the angle of slope of said sidewalls is about 45° with respect to the axis of the aperture.

* * * * *